US011407920B2

(12) United States Patent
Takeuchi et al.

(10) Patent No.: US 11,407,920 B2
(45) Date of Patent: Aug. 9, 2022

(54) PAINT, AIRCRAFT PAINT, AND AIRCRAFT

(71) Applicant: DIC Corporation, Tokyo (JP)

(72) Inventors: Kan Takeuchi, Ichihara (JP); Ikue Hamamoto, Ichihara (JP)

(73) Assignee: DIC Corporation, Tokyo (JP)

(*) Notice: Subject to any disclaimer, the term of this patent is extended or adjusted under 35 U.S.C. 154(b) by 43 days.

(21) Appl. No.: 16/955,366

(22) PCT Filed: Dec. 6, 2018

(86) PCT No.: PCT/JP2018/044882
§ 371 (c)(1),
(2) Date: Jun. 18, 2020

(87) PCT Pub. No.: WO2019/124091
PCT Pub. Date: Jun. 27, 2019

(65) Prior Publication Data
US 2021/0017417 A1 Jan. 21, 2021

(30) Foreign Application Priority Data
Dec. 22, 2017 (JP) .............................. JP2017-246417

(51) Int. Cl.
C09D 175/06 (2006.01)
C08K 3/22 (2006.01)
C08K 3/36 (2006.01)

(52) U.S. Cl.
CPC ............. C09D 175/06 (2013.01); C08K 3/22 (2013.01); C08K 3/36 (2013.01); C08K 2003/2237 (2013.01)

(58) Field of Classification Search
CPC .......... C09D 175/06; C08K 3/22; C08K 3/36; C08K 2003/2237
USPC ....................................................... 524/413
See application file for complete search history.

(56) References Cited

U.S. PATENT DOCUMENTS

| 5,319,056 A | * | 6/1994 | Wamprecht | .......... C08G 63/553 528/49 |
| 6,162,891 A | * | 12/2000 | Wamprecht | ............ C08G 18/68 252/182.25 |
| 6,423,816 B1 | | 7/2002 | Wamprecht et al. | |
| 2008/0234410 A1 | * | 9/2008 | Van Engelen | ....... C08G 18/246 523/507 |

FOREIGN PATENT DOCUMENTS

| EP | 0659795 A2 | | 6/1995 |
| JP | H06-65361 A | | 3/1994 |
| JP | 07-216069 A | | 8/1995 |
| JP | 10-306252 A | | 11/1998 |
| JP | 10306252 A | * | 11/1998 |
| JP | 2009-504864 A | | 2/2009 |
| JP | 2017-105956 A | | 6/2017 |

OTHER PUBLICATIONS

International Search Report dated Mar. 12, 2019, issued for PCT/JP2018/044882.
Supplementary European Search Report dated Sep. 16, 2021, issued for European Patent Application No. 18892529.1.

* cited by examiner

Primary Examiner — Kelechi C Egwim
(74) Attorney, Agent, or Firm — Locke Lord LLP; James E. Armstrong, IV; Nicholas J. DiCeglie, Jr.

(57) ABSTRACT

An object of the present invention is to provide a paint which is excellent in various performances such as resistance to various organic solvents and hydraulic fluid, corrosion resistance, weather resistance, heat resistance, adhesion to substrates, and coating film appearance, and which in particular, can be suitably used for aircraft applications. Specifically, the invention provides a paint which contains, as an essential component of a main agent, a polyester resin (A) having a hydroxyl value in a range of 150 to 400 mg KOH/g and a weight average molecular weight (Mw) in a range of 500 to 5,000, and a polyisocyanate compound (B) as an essential component of a curing agent; an aircraft paint using the paint; and an aircraft using the aircraft paint.

20 Claims, No Drawings

PAINT, AIRCRAFT PAINT, AND AIRCRAFT

TECHNICAL FIELD

The present invention relates to a paint which is excellent in various performances such as resistance to various organic solvents and hydraulic fluid, corrosion resistance, weather resistance, heat resistance, adhesion to substrates, and coating film appearance, and which in particular, can be suitably used for aircraft applications.

BACKGROUND ART

Various resin materials for paints are used in paints used for various structures, for example, building materials, building exteriors, home appliances, transportation equipment, aircrafts, etc., according to use and required performance thereof. Typical examples thereof include a polyester resin, a fluorine resin, and an acrylic resin, and there are various resin designs. Weather resistance is one of the important performances of paints used in outdoor environments such as building materials, building exteriors, transportation equipment, and aircrafts. As a paint excellent in weather resistance, a paint using a fluorine-based resin is widely known (see PTL 1). However, there have been problems such as poor gloss on a coated surface and low resistance to hydraulic fluid.

CITATION LIST

Patent Literature

PTL 1: JP-A-2017-105956

SUMMARY OF INVENTION

Technical Problem

Therefore, a problem to be solved by the invention is to provide a paint which is excellent in various performances such as resistance to various organic solvents and hydraulic fluid, corrosion resistance, weather resistance, heat resistance, adhesion to substrates, and coating film appearance, and which in particular, can be suitably used for aircraft applications.

Solution to Problem

As a result of intensive studies to solve the above problem, the present inventors of the invention have found that a paint containing, as an essential component of a main agent, a polyester resin having a hydroxyl value in a range of 150 to 400 mg KOH/g, and a polyisocyanate compound as an essential component of a curing agent, is excellent in various performances such as resistance to various organic solvents and hydraulic fluid, corrosion resistance, weather resistance, heat resistance, adhesion to substrates, and coating film appearance, and have completed the invention.

That is, the invention relates to a paint containing, as an essential component of a main agent, a polyester resin (A) having a hydroxyl value in a range of 150 to 400 mg KOH/g and a weight average molecular weight (Mw) in a range of 500 to 5,000, and a polyisocyanate compound (B) as an essential component of a curing agent.

The invention further relates to an aircraft paint containing the paint.

The invention further relates to an aircraft using the aircraft paint.

Advantageous Effects of Invention

According to the invention, it is possible to provide a paint which is excellent in various performances such as resistance to various organic solvents and hydraulic fluid, corrosion resistance, weather resistance, heat resistance, adhesion to substrates, and coating film appearance, and which in particular, can be suitably used for aircraft applications.

DESCRIPTION OF EMBODIMENTS

The paint of the invention uses, as an essential component of a main agent, a polyester resin (A) having a hydroxyl value in a range of 150 to 400 mg KOH/g. When the hydroxyl value of the polyester resin (A) is in the range of 150 to 400 mg KOH/g, the polyester resin (A) has an effect of improving resistance to hydraulic fluid and physical properties of the coating film. Moreover, it is preferable that the acid value of the polyester resin (A) is 20 mg KOH/g or less.

In the invention, the hydroxyl value of the polyester resin is a value measured by subjecting a product obtained by acetylating the polyester resin with excess acetic anhydride to a neutralization titration method with 0.5 N potassium hydroxide (ethanol solution) using phenolphthalein as an indicator.

The acid value of the polyester resin is a value measured by a neutralization titration method with 0.1 N potassium hydroxide (ethanol solution) using phenolphthalein as an indicator.

Examples of the polyester resin (A) include those in which a polybasic acid raw material and a polyol raw material are used as reaction raw materials as in the case of a general polyester resin. Further, a monobasic acid raw material or a monohydroxy compound may be used as a reaction raw material depending on desired resin performance.

Specific examples of the polybasic acid raw material include an aliphatic dicarboxylic acid compound such as oxalic acid, malonic acid, succinic acid, maleic acid, fumaric acid, glutaric acid, adipic acid, pimelic acid, suberic acid, azelaic acid and sebacic acid, and a derivatives thereof such as an acid anhydride, an acid halide, and an alkyl ester;

an alicyclic dicarboxylic acid compound such as tetrahydrophthalic acid, hexahydrophthalic acid and methyltetrahydrophthalic acid, and a derivative thereof such as an acid anhydride, an acid halide, and an alkyl ester;

an aromatic dicarboxylic acid compound such as phthalic acid, isophthalic acid and terephthalic acid, and a derivative thereof such as an acid anhydride, an acid halide, and an alkyl ester;

a trifunctional or higher functional aliphatic polycarboxylic acid compound such as 1,2,5-hexanetricarboxylic acid, and a derivative thereof such as an acid anhydride, an acid halide, and an alkyl ester;

a trifunctional or higher functional alicyclic polycarboxylic acid compound such as 1,2,4-cyclohexanetricarboxylic acid, and a derivative thereof such as an acid anhydride, an acid halide, and an alkyl ester;

a trifunctional or higher functional aromatic polycarboxylic acid compound such as trimellitic acid, trimellitic anhydride, 1,2,5-benzenetricarboxylic acid, and 2,5,7-naphthalenetricarboxylic acid, and a derivative thereof such as an acid anhydride, an acid halide, and an alkyl ester. These may be used alone or in combination of two or more.

Among these compounds, it is preferable that 50 mol % or more of the polybasic acid raw material is an alicyclic dicarboxylic acid or a derivative thereof for an excellent resistance to hydraulic fluid. Furthermore, for an excellent weather resistance, it is preferable to use an alicyclic dicarboxylic acid or a derivative thereof and an aliphatic dicarboxylic acid compound or a derivative thereof in combination, and it is preferable that the total of the two in the polybasic acid raw material is 90 mol % or more. Among the aliphatic dicarboxylic acid compounds or derivatives thereof, a straight-chain saturated aliphatic dicarboxylic acid compound having 4 to 8 carbon atoms or a derivative thereof is preferable.

Specific examples of the polyol raw material include a straight-chain aliphatic diol compound such as ethylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, and 1,12-dodecanediol;

an aliphatic hydrocarbon diol compound having a branched chain such as propylene glycol, 2-methyl-1,3-propanediol, neopentyl glycol, 2-ethyl-1,3-propanediol, 2-methyl-1,4-butanediol, 2-ethyl-2-methyl-1,3-propanediol, 2-ethylbutane-14-butanediol, 2,3-dimethyl-1,4-butanediol, 3-methyl-1,5-pentanediol, 2,4-dimethyl-1,5-pentanediol, 3,3-dimethylpentane-1,5-diol, 2,2-diethyl-1,3-propanediol, 3-propylpentane-1,5-diol, 2,2-diethyl-1,4-butanediol, 2,4-diethyl-1,5-pentanediol, 2,2-dipropyl-1,3-propanediol, 2-ethyl-2-butyl-1,3-propanediol, and 2,5-diethyl-1,6-hexanediol;

an alicyclic structure-containing diol compound such as cyclohexanediol and cyclohexanedimethanol;

an aromatic ring-containing diol compound such as biphenol and bisphenol;

a trifunctional or higher functional aliphatic polyol compound such as trimethylolethane, trimethylolpropane, glycerin, hexanetriol, and pentaerythritol;

a trifunctional or higher functional aromatic polyol compound such as trihydroxybenzene;

a polyether-modified polyol compound obtained by ring-opening polymerization of the aforementioned various diols or trifunctional or higher functional polyol compounds and a cyclic ether compound such as ethylene oxide, propylene oxide, tetrahydrofuran, ethyl glycidyl ether, propyl glycidyl ether, butyl glycidyl ether, phenyl glycidyl ether, and allyl glycidyl ether;

and a polycarbonate polyol. These may be used alone or in combination of two or more.

Among these compounds, it is preferable that 80 mol % or more of the polyol raw material is an aliphatic compound. Moreover, it is preferable to use the aliphatic hydrocarbon diol compound having a branched chain as the polyol raw material.

For an excellent resistance to hydraulic fluid, it is preferable to use a trifunctional or higher functional compound as a part of the polybasic acid raw material or the polyol raw material for the polyester resin (A). Among the trifunctional or higher functional compounds, a trifunctional or higher functional aliphatic polyol compound is preferable. In this case, it is preferable that 5 to 70 mol % of the polyol raw material is a trifunctional or higher functional aliphatic polyol compound.

Furthermore, for an excellent weather resistance, it is preferable that 80% by mass or more of the reaction raw material of the polyester resin (A) is a non-aromatic compound.

The method for producing the polyester resin (A) is not particularly limited, and the polyester resin (A) may be produced by any method. Specifically, it may be produced by reacting all of the reaction raw materials at once, or it may be produced by a method in which a part of the reaction raw materials is added separately. The reaction temperature is preferably about 180 to 300° C., the same as the reaction temperature for a general polyester resin, and a known conventional esterification catalyst may be used as necessary.

The polyester resin (A) may be reacted in an organic solvent as necessary, or an organic solvent may be added after completion of the reaction to adjust the viscosity, etc. The organic solvent is not particularly limited as long as it can dissolve the polyester resin (A), and a known conventional organic solvent may be used. Examples of the organic solvent include a ketone solvent such as acetone, methyl ethyl ketone, methyl isobutyl ketone, and 2-heptanone; a cyclic ether solvent such as tetrahydrofuran and dioxolane; an ester solvent such as methyl acetate, ethyl acetate, and butyl acetate; an aromatic hydrocarbon solvent such as toluene, xylene, and Solvesso; and an alcohol solvent such as carbitol, cellosolve, methanol, isopropanol, butanol, and propylene glycol monomethyl ether. Although the dilution rate by these organic solvents is suitably adjusted according to a use, etc., it is possible to make a paint with a relatively small amount of solvent since the polyester resin (A) has high solubility in various organic solvents. More specifically, it is possible to make a paint with such a dilution rate that a nonvolatile content is 70% by mass or more.

In the case where the weight average molecular weight (Mw) of the polyester resin (A) is in the range of 500 to 5,000, a paint having excellent coating workability and coating film physical properties can be obtained. It is more preferably in the range of 500 to 3,000. In the invention, the molecular weight of the polyester resin (A) is a value measured by gel permeation chromatography (GPC) under the following conditions.

Measuring device: HLC-8320GPC manufactured by Tosoh Corporation

Column: TSKgel 5000HXL, TSKgel 4000HXL, TSKgel 3000HXL, TSKgel 2000HXL manufactured by Tosoh Corporation Detector: RI (differential refractometer)

Data processing: HLC-8320GPC Eco SEC-WorkStation manufactured by Tosoh Corporation Measurement conditions: column temperature 40° C.

Solvent tetrahydrofuran

Flow rate 1.00 ml/min

Standard: monodisperse polystyrene

Sample: 0.2% tetrahydrofuran solution in terms of resin solid content, which was subjected to filtering with a microfilter (100 μl)

The main agent used in the invention may contain a resin component other than the polyester resin (A). Specifically, a polyester resin other than the polyester resin (A), a polyether polyol, a polycarbonate polyol, a polyurethane polyol, and the like may be mentioned. When these other resin components are used, it is preferable that 70% by mass or more of the resin components of the main agent is the polyester resin (A) because the effects of the invention can be sufficiently exhibited.

The paint of the invention uses the polyisocyanate compound (B) as an essential component of the curing agent. Specific examples of the polyisocyanate compound include an aliphatic diisocyanate compound such as butane diisocyanate, hexamethylene diisocyanate, 2,2,4-trimethylhexamethylene diisocyanate, and 2,4,4-trimethylhexamethylene diisocyanate;

an alicyclic diisocyanate compound such as norbornane diisocyanate, isophorone diisocyanate, hydrogenated xylylene diisocyanate, and hydrogenated diphenylmethane diisocyanate;

an aromatic diisocyanate compound such as tolylene diisocyanate, xylylene diisocyanate, tetramethyl xylylene diisocyanate, diphenylmethane diisocyanate, and 1,5-naphthalene diisocyanate;

polymethylene polyphenyl polyisocyanate having a repeating structure represented by the following structural formula (1);

[Chem. 1]

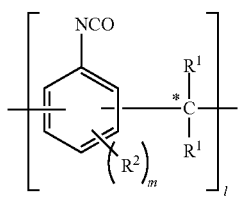

(1)

[In the formula, each $R^1$ independently represents a hydrogen atom or a hydrocarbon group having 1 to 6 carbon atoms. Each $R^2$ independently represents an alkyl group having 1 to 4 carbon atoms, or a bonding point which is connected to the structural portion represented by the structural formula (1) via a methylene group marked with an asterisk *. m is 0 or an integer of 1 to 3, and 1 is an integer of 1 or more.]

an isocyanurate modified product thereof, a biuret modified product thereof, an allophanate modified product thereof, etc. These may be used alone or in combination of two or more.

Among these compounds, for an excellent resistance to hydraulic fluid and an excellent weather resistance, the aliphatic diisocyanate compound or a modified product thereof is preferable, and a biuret modified product of an aliphatic diisocyanate is more preferable. In addition, it is preferable that the polyisocyanate compound (B) has an isocyanate group content of 10 to 30% by mass.

The curing agent used in the invention may contain a resin component other than the polyisocyanate compound (B). Specifically, an amino resin, a resole resin, an epoxy resin and the like may be mentioned. When these other resin components are used, it is preferable that 70% by mass or more of the resin components of the curing agent is the polyisocyanate compound (B) because the effects of the invention can be sufficiently exhibited.

The paint of the invention may contain a curing catalyst, a curing accelerator, a pigment, a pigment dispersant, a matting agent, a leveling agent, a drying inhibitor, an ultraviolet absorber, an anti-foaming agent, a thickener, an anti-settling agent, an organic solvent, etc. The types and amounts of these various additives are appropriately adjusted according to the use and desired performance of the paint. The aforementioned various additives may be added to either or both of the main agent and the curing agent.

The use of the paint of the invention is not particularly limited. However, since the paint is excellent in weather resistance, corrosion resistance, and solvent resistance, it may be suitably used, for example, for coated steel plates and various metal applications such as home appliances, automobiles, aircrafts, and building materials. The paint particularly has excellent performance as an aircraft paint.

When coating is performed with the paint of the invention, the coating may be either a single layer or multiple layers. In the case of multiple layers, one or more kinds of the paint of the invention may be applied in a layered manner, or the paint of the invention may be combined with the other paint for coating. Examples of the other paint include a paint containing a polyester resin, a urethane resin, an epoxy resin, etc. as a main agent. In the case of coating for the aforementioned various uses, generally, a method of applying a layer called a primer layer on a substrate and then applying a layer called a top coat layer thereon is widely used. The paint of the invention may be used as a primer layer, and may also be used as a top coat layer. The thickness of the primer layer is preferably about 0.5 to 30 μm. Further, the thickness of the top coat layer is preferably about 1 to 60 μm. The coating method of the paint may be any known conventional method such as spray coating, dip coating, spin coating, flow coating, and roller coating. The curing conditions of the paint are appropriately adjusted according to the selection of the curing agent, film thickness and the like. However, a method of heating and curing in a temperature range of about 120 to 350° C. for several seconds to several minutes is preferable.

EXAMPLES

The invention will be described in more detail below with reference to specific synthesis examples and examples. Hereinafter, "part" and "%" are based on mass unless otherwise specified.

In the examples of the present application, the number average molecular weight (Mn), the weight average molecular weight (Mw), and the molecular weight distribution (Mw/Mn) were measured by gel permeation chromatography (GPC) under the following conditions.

Measuring device: HLC-8320GPC manufactured by Tosoh Corporation

Column: TSKgel 5000HXL, TSKgel 4000HXL, TSKgel 3000HXL, TSKgel 2000HXL manufactured by Tosoh Corporation Detector: RI (differential refractometer)

Data processing: HLC-8320GPC Eco SEC-WorkStation manufactured by Tosoh Corporation Measurement conditions: column temperature 40° C.

Solvent tetrahydrofuran

Flow rate 1.00 ml/min

Standard: monodisperse polystyrene

Sample: 0.2% tetrahydrofuran solution in terms of resin solid content, which was subjected to filtering with a microfilter (100 μl)

The hydroxyl value of the polyester resin was measured by subjecting a product obtained by acetylating the polyester resin with excess acetic anhydride to a neutralization titration method with 0.5 N potassium hydroxide (ethanol solution) using phenolphthalein as an indicator.

The acid value of the polyester resin was measured by a neutralization titration method with 0.1 N potassium hydroxide (ethanol solution) using phenolphthalein as an indicator.

Production Example 1: Production of Polyester Resin (A-1)

In a four-necked flask equipped with a stirrer, a thermometer, a reflux condenser with a dehydration trap, and a nitrogen gas inlet pipe, 22.5 parts by mass of neopentyl glycol, 30.4 parts by mass of trimethylolpropane, 29.2 parts by mass of hexahydrophthalic anhydride, 17.9 parts by mass of adipic acid, and 0.025 parts by mass of dibutyltin oxide were charged and heated to 230° C. to cause reaction. After confirming that the hydroxyl value reached around a design value, the reaction mixture was cooled and 2-heptanone was added to adjust a non-volatile content to about 80% by mass to obtain a polyester resin (A-1) solution. The polyester resin (A-1) had a hydroxyl value of 295 mg KOH/g, an acid value of 10 mg KOH/g, and a weight average molecular weight (Mw) of 860.

Production Example 2: Production of Polyester Resin (A-2)

In a four-necked flask equipped with a stirrer, a thermometer, a reflux condenser with a dehydration trap, and a nitrogen gas inlet pipe, 42.2 parts by mass of neopentyl glycol, 7.9 parts by mass of trimethylolpropane, 33.1 parts by mass of hexahydrophthalic anhydride, 16.8 parts by mass of adipic acid, and 0.025 parts by mass of dibutyltin oxide were charged and heated to 230° C. to cause reaction. After confirming that the hydroxyl value reached around a design value, the reaction mixture was cooled and 2-heptanone was added to adjust a non-volatile content to about 80% by mass to obtain a polyester resin (A-1) solution. The polyester resin (A-1) had a hydroxyl value of 198 mg KOH/g, an acid value of 10 mg KOH/g, and a weight average molecular weight (Mw) of 1,600.

Examples 1 and 2 and Comparative Example 1

Paints were produced as below, and various evaluation tests were conducted. The results are shown in Table 2.

The various evaluation tests were conducted according to MIL-PRF-85285E unless otherwise stated.

Production of Main Agent

Components were blended in the proportions shown in Table 1 and were dispersed by a bead mill until the particle size of titanium oxide became 10 μm or less.

Details of each component in Table 1 are as follows.

Fluorine-based resin: "Fluonate K-704" produced by DIC Corporation, hydroxyl value of solid content 48 mg KOH/g
Titanium oxide: "Ti-PureR960" produced by DuPont
Silica: "Aerosil R972" produced by Evonik Industries
Solvent: mixed solvent of methyl aminoketone/propylene glycol monomethyl ether acetate/butyl acetate/methyl ethyl ketone/acetylacetone

TABLE 1

|  |  | Example 1 | Example 2 | Comparative Example 1 |
|---|---|---|---|---|
| Polyester resin (A-1) solution (Non-volatile content 77.2 mass %) | [parts by mass] | 77.9 | | |
| Polyester resin (A-2) solution (Non-volatile content 80.1 mass %) | [parts by mass] | | 75.0 | |
| Fluorine-based resin (Non-volatile content 60 mass %) | [parts by mass] | | | 102.2 |
| Titanium oxide | [parts by mass] | 147 | 147 | 147 |
| Silica | [parts by mass] | 0.9 | 0.9 | 0.9 |
| Solvent | [parts by mass] | 94.2 | 97.1 | 69.9 |
| Non-volatile content | [% by mass] | 65 | 65 | 65 |

Production of Paint

The main agent previously obtained and a curing agent ("desmodur N75 MPA" produced by Covestro, biuret modified product of hexamethylene diisocyanate, isocyanate group content 16.5% by mass, non-volatile content 75.2% by mass) were blended such that the molar ratio of the hydroxyl group in the main agent to the isocyanate group in the curing agent was 1/1 to obtain the paint.

Preparation of Coated Plate

The paint previously obtained was applied on a chromate-treated aluminum plate ("Alodine 1200" manufactured by Henkel) using a bar coater and was dried for about 8 hours to form a coated plate having a coating film of about 50 μm.

Measurement of Surface Hardness of Coating Film

The pencil hardness of the coated surface of the coated plate previously obtained was measured according to JIS K5600-5-4. Specifically, a pencil lead was placed on the coated surface of the coated plate at an angle of about 45°, and the pencil was moved forward about 10 mm at a uniform speed while being pressed against the test coating film strongly to such a degree the lead would not break. The hardness symbol of the hardest pencil that did not scratch the coating film was taken as the pencil hardness.

Evaluation of Solvent Resistance

A piece of 1 cm×1 cm×4 cm absorbent cotton was impregnated with methyl ethyl ketone, and the absorbent cotton was folded and inserted at the tip of a 1 cm×1 cm indenter. A load of 1 kg was applied to the indenter and the indenter reciprocated 25 times on the coated surface. The coated surface after the test was visually observed and evaluated according to the following criteria.

A: no change on the coated surface
B: clouding or peeling occurs on the coated surface Evaluation of Substrate Adhesion Cuts were made with a cutter knife into the coated surface of the coated plate previously obtained in a 10×10 grid pattern at intervals of 2 mm to make 100 grids of 2 mm². A cellophane tape manufactured by Nichiban Co., Ltd. was attached on the grids and rapidly peeled off, and the number of grids remaining without peeling was counted.

Evaluation of Resistance to Hydraulic Fluid

A test piece of 8 cm×6 cm in size was cut out from the coated plate previously obtained, and after a cross cut was made on the coated surface with a cutter, the test piece was immersed in a phosphoric acid ester-based flame-retardant aircraft hydraulic fluid "skydrol LD-4" at 25° C. for 7 days. After 60 minutes after the test piece was pulled up, the appearance was visually evaluated.

Criteria for evaluation and determination are as follows:
A: no abnormality in appearance
B: occurrence of swelling less than 3 mm at the cross cut portion or an end portion
C: occurrence of swelling of 3 mm or more at the cross cut portion or an end portion SST (Salt Spray) Test The test was performed according to JIS K-5600-7-1 (1999). After making a cross cut with a cutter on the coated surface of the coated plate previously obtained, the coated plate was placed in a tester. After 2000 hours, the appearance was visually evaluated.

Weather Resistance Test (Evaluation by ΔE Value)

The coated plate previously obtained was subjected to an accelerated weathering test for 1000 hours using a super xenon weather meter tester ("SX2-75" manufactured by Suga Test Instruments Co., Ltd.). L, a, and b values of the coated surface of the coated plate before and after the test were measured, and with the measured values, the color difference ΔE value was obtained according to a calculation formula to perform the evaluation.

(Test Conditions)
Irradiance: 180 W/m$^2$ (wavelength range 300 to 700 nm)
Black panel temperature: 63° C.
Method of light irradiation and water spray: 120-minute cycle (light irradiation for 102 minutes, followed by light irradiation and water spray for 18 minutes)

Weather Resistance Test (Gloss Evaluation)

The coated plate previously obtained was subjected to an accelerated weathering test for 1000 hours using a super xenon weather meter tester ("SX2-75" manufactured by Suga Test Instruments Co., Ltd.). The 60° specular reflectance (%) of the coated surface of the coated plate after the test was measured with a gloss meter ("Gloss Meter VG7000" manufactured by Nippon Denshoku Industries Co., Ltd.).

(Test Conditions)
Irradiance: 180 W/m$^2$ (wavelength range 300 to 700 nm)
Black panel temperature: 63° C.
Method of light irradiation and water spray: 120-minute cycle (light irradiation for 102 minutes, followed by light irradiation and water spray for 18 minutes)

TABLE 2

|  | Example 1 | Example 2 | Comparative Example 1 |
|---|---|---|---|
| Surface hardness | 2H | 2B | HB |
| Solvent resistance | A | A | A |
| Substrate adhesion | 69/100 | 69/100 | 66/100 |
| Resistance to hydraulic fluid | A | A | C |
| SST (salt spray) test - 2000 hours | No change | No change | No change |
| Weather resistance test (ΔE value) - 1000 hours | 0.15 | 0.15 | 0.41 |
| Weather resistance test (gloss) - 1000 hours | 62.2 | 69.0 | 2.7 |

The invention claimed is:

1. A paint comprising, as an essential component of a main agent, a polyester resin (A) having a hydroxyl value in a range of 150 to 400 mg KOH/g and a weight average molecular weight (Mw) in a range of 500 to 5,000, and a polyisocyanate compound (B) as an essential component of a curing agent, wherein
   the polyester resin (A) is obtained from a polybasic acid raw material and a polyol raw material,
   the polybasic acid raw material of the polyester resin (A) is a combination of a saturated aliphatic dicarboxylic acid or a derivative thereof and an alicyclic dicarboxylic acid or a derivative thereof,
   the total amount of the saturated aliphatic dicarboxylic acid or a derivative thereof and the alicyclic dicarboxylic acid or a derivative thereof is 90 mol % or more of the polybasic acid raw material,
   80 mol % or more of the polyol raw material is an aliphatic polyol compound and 5 to 70 mol % of the polyol raw material is a trifunctional or higher functional aliphatic polyol compound, and
   70% by mass or more of a resin component in the main agent is the polyester resin (A).

2. The paint according to claim 1, wherein the polyester resin (A) has an acid value of 20 mg KOH/g or less.

3. The paint according to claim 1, wherein 80% by mass or more of a reaction raw material of the polyester resin (A) is a non-aromatic compound.

4. The paint according to claim 1, wherein 50 mol % or more of a polybasic acid raw material of the polyester resin (A) is an alicyclic dicarboxylic acid or a derivative thereof.

5. The paint according to claim 1, wherein 90 mol % or more of the polybasic acid raw material of the polyester resin (A) is the saturated aliphatic dicarboxylic acid or a derivative thereof and the alicyclic dicarboxylic acid or a derivative thereof.

6. The paint according to claim 1, wherein the polyisocyanate compound (B) has an isocyanate group content of 10 to 30% by mass.

7. The paint according to claim 1, wherein the polyisocyanate compound (B) is a biuret modified product of an aliphatic diisocyanate.

8. The paint according to claim 1, wherein 70% by mass or more of a resin component in the curing agent is the polyisocyanate compound (B).

9. The paint according to claim 1, wherein the paint is an aircraft paint.

10. An aircraft coated with the aircraft paint according to claim 9.

11. The paint according to claim 2, wherein the paint is an aircraft paint.

12. The paint according to claim 3, wherein the paint is an aircraft paint.

13. The paint according to claim 4, wherein the paint is an aircraft paint.

14. The paint according to claim 5, wherein the paint is an aircraft paint.

15. The paint according to claim 6, wherein the paint is an aircraft paint.

16. The paint according to claim 7, wherein the paint is an aircraft paint.

17. The paint according to claim 8, wherein the paint is an aircraft paint.

18. An aircraft coated with the aircraft paint according to claim 11.

19. An aircraft coated with the aircraft paint according to claim 12.

20. An aircraft coated with the aircraft paint according to claim 13.

* * * * *